US009992039B2

(12) United States Patent
Anandan et al.

(10) Patent No.: US 9,992,039 B2
(45) Date of Patent: Jun. 5, 2018

(54) ACTIVATING MOBILE BACKUP LINK BASED ON WIRED CUSTOMER EDGE-PROVIDER EDGE (CE-PE) LINK STATUS (71) Applicant: CISCO TECHNOLOGY, INC., San Jose, CA (US)

(72) Inventors: Swapna Anandan, Fremont, CA (US); Sujay Gopinathan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 14/336,826

(22) Filed: Jul. 21, 2014

(65) Prior Publication Data
US 2015/0326471 A1 Nov. 12, 2015

Related U.S. Application Data (60) Provisional application No. 61/989,949, filed on May 7, 2014.

(51) Int. Cl.
H04L 12/46 (2006.01)
H04L 12/707 (2013.01)
H04L 12/801 (2013.01)

(52) U.S. Cl.
CPC .......... H04L 12/4633 (2013.01); H04L 45/22 (2013.01); H04L 47/12 (2013.01)

(58) Field of Classification Search
CPC .......... H04L 45/22; H04L 45/28; H04L 45/58
See application file for complete search history.

(56) References Cited

U.S. PATENT DOCUMENTS

| 6,868,060 | B2 | 3/2005 | Barzegar et al. |
| 7,877,953 | B2 | 12/2010 | Filsfils et al. |
| 7,864,669 | B2 | 1/2011 | Bonaventure et al. |
| 8,014,275 | B1 | 9/2011 | Sundt et al. |
| 8,121,032 | B2 | 2/2012 | Dharwadkar et al. |
| 8,750,099 | B2 | 6/2014 | Patel et al. |
| 2002/0089958 | A1* | 7/2002 | Feder .................. H04L 12/4633 370/338 |
| 2011/0158098 | A1* | 6/2011 | Daraiseh ............... H04W 40/02 370/235 |

(Continued)

OTHER PUBLICATIONS

Devarapalli, et al., "RFC 3963: Network Mobility (NEMO) Basic Support Protocol," Network Working Group, Jan. 2005, 34 pages.

(Continued)

Primary Examiner — Jackie Zuniga Abad
(74) Attorney, Agent, or Firm — Patterson + Sheridan LLP (57) ABSTRACT A method is provided in one embodiment and includes establishing a primary wired access link between a first routing device and a second routing device, and establishing a backup wireless access link between the first routing device and the second routing device. The method further includes determining a status of the primary wired access link indicative of whether the primary wired access link between the first routing device and the second routing device has failed. The method still further include activating the backup wireless access link between the first routing device and the second routing device when it is determined that the status of the primary wired access link is indicative that the primary wired access link has failed.

14 Claims, 3 Drawing Sheets (56) References Cited

U.S. PATENT DOCUMENTS

2012/0069745 A1* 3/2012 Kini ................. H04L 45/22
370/252
2013/0259058 A1* 10/2013 Vairavakkalai ....... H04L 45/023
370/401

OTHER PUBLICATIONS

Johnson, D., et al., "RFC 3775: Mobility Support in IPv6," Network Working Group, Jun. 2004, 166 pages.
Katz, D., et al., "RFC 5880: Bidirectional Forwarding Detection (BFD)," Internet Engineering Task Force (IETF), Jun. 2010, 49 pages.
Leung, K., et al., "RFC 5177: Network Mobility (NEMO) Extensions for Mobile IPv4," Network Working Group, Apr. 2008, 26 pages.
Rekhter, Y., et al., "RFC 4271: A Border Gateway Protocol 4 (BGP-4)," Networking Working Group, Jan. 2006, 104 pages.

* cited by examiner

ACTIVATING MOBILE BACKUP LINK BASED ON WIRED CUSTOMER EDGE-PROVIDER EDGE (CE-PE) LINK STATUS

CROSS-REFERENCE TO RELATED APPLICATION

This application claims the benefit of priority under 35 U.S.C. § 119(e) to U.S. Provisional Application Ser. No. 61/989,949, entitled "ACTIVATING MOBILE BACKUP LINK BASED ON CUSTOMER EDGE-PROVIDER EDGE (CE-PE) LINK STATUS" filed May 7, 2014, which is hereby incorporated by reference in its entirety.

TECHNICAL FIELD

This disclosure relates in general to the field of communications and, more particularly, to activating mobile backup link based on wired customer edge-provider edge (CE-PE) link status.

BACKGROUND

Enterprise customers often have a customer edge router installed at the customer premises connected to a provider edge router at the provider edge of the service provider to allow user equipment at the customer premises to access external packet data networks such as the Internet. T1/T3 connections at the customer premises are typically used to connect the customer edge router to the provider edge router through a service provider multiprotocol label switching (MPLS) core network. A problem may arise in situations in which there is a failure of the connection between the customer edge router and the provider edge router, resulting in loss of connectivity between the user equipment at the customer premises and the packet data network. Thus, it is sometimes desirable to establish a backup connection between the customer edge router and the provider edge router for use in situations in which there is a failure of the primary connection.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EXAMPLE EMBODIMENTS

Overview

A method is provided in one embodiment and includes establishing a primary wired access link between a first routing device and a second routing device, and establishing a backup wireless access link between the first routing device and the second routing device. The method further includes determining a status of the primary wired access link indicative of whether the primary wired access link between the first routing device and the second routing device has failed. The method still further include activating the backup wireless access link between the first routing device and the second routing device when it is determined that the status of the primary wired access link is indicative that the primary wired access link has failed.

In particular embodiments, establishing the primary wired access link between the first routing device and the second routing device further includes installing the primary wired access link in a routing information base associated with the first routing device. In still other particular embodiments, activating the backup wireless access link between the first routing device and the second routing device includes installing the backup wireless access link in a routing information base (RIB) associated with the first routing device when it is determined that the status of the primary wired access link is indicative that the primary wired access link has failed. In still other particular embodiments, installing the backup wireless access link in the routing information base (RIB) is performed by a routing agent associated with the first routing device.

In particular embodiments, determining the status of the primary wired access link includes determining whether the primary wired access link has failed using a Bidirectional Forwarding Detection (BFD) protocol. In other particular embodiments, the primary wired access link is a Multiprotocol Label Switching (MPLS) link. In still other particular embodiments, the primary wired access link is one or more of a T1 link or a T3 link. In other particular embodiments, the primary wired access link utilizes a border gateway protocol (BGP). In still other particular embodiments, the backup wireless access link utilizes a mobile IP protocol.

In particular embodiments, the backup wireless access link running Mobile IP (MIP) protocol is one or more of a 3G link, a 4G link, or an LTE link. In still other particular embodiments, the first routing device is a customer edge routing device. In still other particular embodiments, the second routing device is a provider edge routing device.

Logic encoded in one or more non-transitory media is provided in one embodiment that includes code for execution and when executed by a processor operable to perform operations including establishing a primary wired access link between a first routing device and a second routing device, and establishing a backup wireless access link between the first routing device and the second routing device. The operations further include determining a status of the primary wired access link indicative of whether the primary wired access link between the first routing device and the second routing device has failed. The operations still further include activating the backup wireless access link between the first routing device and the second routing device when it is determined that the status of the primary wired access link is indicative that the primary wired access link has failed.

A first routing device is provided in one embodiment and includes a memory element configured to store electronic code, a processor operable to execute instructions associated with the electronic code, and a module coupled to the memory element and the processor. The first routing device is configured for establishing a primary wired access link between the first routing device and a second routing device, and establishing a backup wireless access link between the first routing device and the second routing device. The first routing device is further configured for determining a status of the primary wired access link indicative of whether the primary wired access link between the first routing device and the second routing device has failed. The first routing device is still further configured for activating the backup wireless access link between the first routing device and the second routing device when it is determined that the status of the primary wired access link is indicative that the primary wired access link has failed.

Example Embodiments

Figure 1:
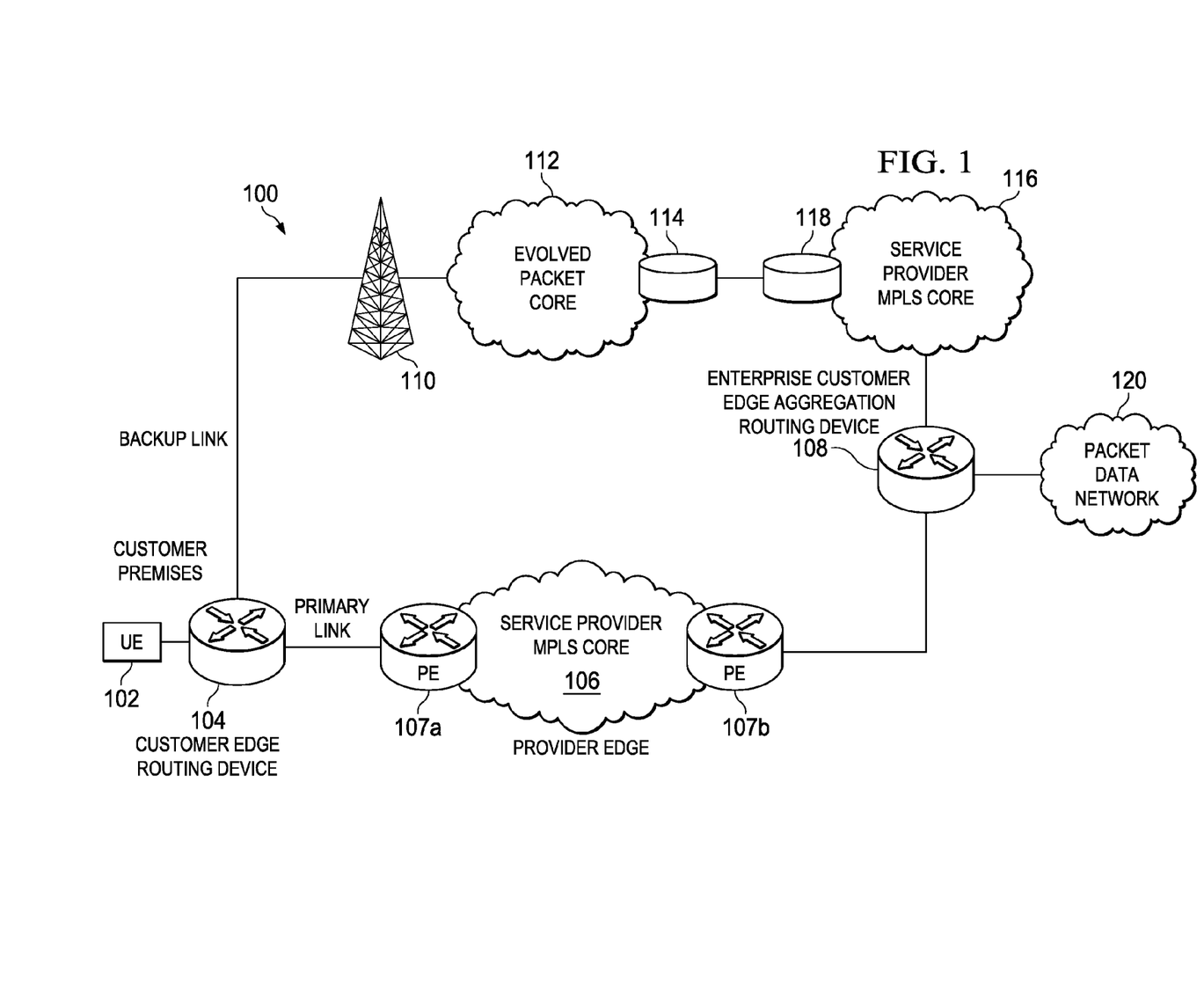
FIG. 1 is a simplified block diagram of a communication system for activating mobile backup link based on customer edge-provider edge (CE-PE) link status in accordance with one embodiment of the present disclosure.

Referring now to FIG. 1, FIG. 1 is a simplified block diagram of a communication system 100 for activating mobile backup access link based on customer edge-provider edge (CE-PE) link status in accordance with one embodiment of the present disclosure. Communication system 100 includes user equipment (UE) 102, a customer edge (CE) routing device 104, a first service provider Multiprotocol Label Switching (MPLS) core network 106, first provider edge (PE) routing device 107a, a second provider edge (PE) routing device 107b, an enterprise customer edge aggregation routing device 108, a radio access network (RAN) 110, an evolved packet core network 112, a mobile packet core router 114, a second service provider MPLS core network 116, and an MPLS core router 118.

User equipment (UE) 102 is in communication with CE routing device 104, and CE routing device 104 is in further communication with first service provider MPLS core network 106 via first PE routing device 107a. First service provider MPLS core network 106 is in further communication with enterprise customer edge aggregation routing device 108 via second PE routing device 107b. CE routing device 104 is in further communication with RNC 110. RNC 110 is in communication with evolved packet core network 112. Mobile packet core router 114 of evolved packet core network 112 is in communication with MPLS core router 118 of second service provider MPLS core network 116. Second service provider MPLS core network 116 is in communication with enterprise customer edge aggregation 108. Enterprise customer edge aggregation routing device 108 is in further communication with a packet data network 120 such as the Internet. In particular embodiments, one or more of user equipment (UE) 102 and CE routing device 104 are located at a customer premises location. In other particular embodiments, one of first service provider MPLS core network 106, evolved packet core network 112, and second service provider MPLS core network 116 are located within a service provider network and enterprise customer edge aggregation routing device 108 is located in the Enterprise Data Center. In particular embodiments enterprise CE aggregation router 108 is a handoff/termination point of an MPLS/VPN secured circuit to a private data center network and may function to aggregate connections from a number of customers premises. In a particular example, a retail banking branch may have a wired primary connection and a wireless backup connection via the service provider to connect to a bank/enterprise headquarter/datacenter.

In various embodiments, user equipment (UE) 102 is configured to send communications to and receive communications from packet data network 120 via various component of communication system 100 as will be described herein. The term 'user equipment' is interchangeable with the terminology 'endpoint' and 'wireless device', where such terms are inclusive of devices used to initiate a communication, such as a computer, a personal digital assistant (PDA), a laptop or electronic notebook, a cellular telephone, an i-Phone, an i-Pad, an Android phone, an IP phone, or any other device, component, element, or object capable of initiating voice, audio, video, media, or data exchanges within communication system 100.

User equipment (UE) 102 may also be inclusive of a suitable interface to the human user, such as a microphone, a display, a keyboard, or other terminal equipment. User equipment 102 may also be any device that seeks to initiate a communication on behalf of another entity or element, such as a program, a database, or any other component, device, element, or object capable of initiating an exchange within communication system 100. Data, as used herein in this document, refers to any type of numeric, voice, video, or script data, or any type of source or object code, or any other suitable information in any appropriate format that may be communicated from one point to another.

CE routing device 104 is a routing device at the customer premises that is connected to enterprise customer edge aggregation routing device 108 to enable user equipment 102 to communicate with packet data network 120. In a particular embodiment, CE routing device 104 is a mobile router. In one or more embodiments, CE routing device 104 is configured to be connected to enterprise customer edge aggregation routing device 108 via a primary fixed access link and/or a backup mobile link. In one or more embodiments, the primary fixed access link is established between CE routing device 104 and first service provider MPLS core network 106 and first service provider MPLS core network 106 is connected to enterprise customer edge aggregation routing device 108. In one or more embodiments, the primary fixed access link is a wired link. In particular embodiments, the primary fixed access link is a T1/T3 link using a border gateway protocol (BGP) such as described in IETF RFC 4271. BGP is a standardized exterior gateway protocol designed to exchange routing and reachability information between systems on a network. BGP makes routing decisions based upon paths, network policies and/or rule-sets configured by a network administrator.

In one or more embodiments, the backup mobile link is established between CE routing device 104 and evolved packet core network 112 via RAN 110. Mobile packet core router 114 of evolved packet core network 112 is connected to MPLS core router 118 of second service provider MPS core network 116, and second MPLS core network 116 is connected to enterprise customer edge aggregation routing device 108. In particular embodiments, the backup mobile link is a wireless link using a Mobile IP protocol, such as a 3G/4G link, established between CE routing device 104 and evolved packet core network 112. In one or more embodiments, evolved packet core network 112 is a mobile core network of a Long-Term Evolution (LTE) mobile network.

The Mobile IP protocol is an Internet Engineering Task Force (IETF) standard communications protocol that is designed to allow mobile device users to move from one network to another while maintaining a permanent IP address. Mobile IP for IPv4 is described in IETF RFC 5944, and extensions are defined in IETF RFC 4721. Mobile IP for IPv6 is described in IETF RFC 6275. The Mobile IP protocol allows for location-independent routing of IP datagrams. Each mobile node is identified by its home address disregarding its current location. While away from its home network, a mobile node is associated with a care-of address that identifies its current location and its home address is associated with the local endpoint of a tunnel to its home agent. The mobile node is a device such as a cell phone, personal digital assistant, personal computer, or other user equipment. A home agent is a router on the home network serving as the anchor point for communication with the mobile node and tunnels packets from another device on the network through an established tunnel. The foreign agent is a router that may function as the point of attachment for the mobile node when it roams to a foreign network. The Mobile IP process typically includes three main phases: an agent discovery phase in which the mobile node discovers its foreign and home agents; a registration phase in which the mobile node registers its current location with the foreign agent and the home agent; and a tunneling phase in which a reciprocal tunnel is set up by the home agent to the care-of address to route packets to the mobile node as it roams. A key assumption in the MIP implementation is that all the links and the path selection are under the control of MIP system. There is no assumption on the mobile network route reachability over an alternative path. In this scenario, activating the wireless MIP system should occur only on the wired link failure and not doing so will result in conflict of default route ownership.

In accordance with one or more embodiments, CE routing device 104 is configured to establish a primary fixed access link (or route) with enterprise customer edge aggregation routing device 108 and establish a backup access link (or route) with enterprise customer edge aggregation routing device 108. In one or more embodiments, the primary fixed access link is installed in a Routing Information Base (RIB) of CE routing device 104. The RIB includes a routing table storing routes to particular network destinations from CE routing device 104. In one or more embodiments, CE routing device 104 is further configured to monitor a status of the primary access link indicative of whether the primary access link between CE routing device 104 and wired enterprise customer edge aggregation routing device 108 has failed, and activate the mobile backup access link between CE routing device 104 and enterprise customer edge aggregation routing device 108 when it is determined that the status of the primary access link is indicative that the primary access link has failed. In various embodiments, CE routing device 104 is configured to bring up a routing agent to install the backup mobile link in the routing information base (RIB) of CE routing device 104. Upon installation of the backup mobile link in the RIB of CE routing device 104, user equipment 102 will utilize the backup mobile link to communicate with packet data network 120.

Note that before detailing some of the operational aspects of FIG. 1, it is important to understand some limitations of current implementations of using a backup access link when a primary customer edge-provider edge (CE-PE) fixed access link using a T1/T3 connection is down. The following foundational information is offered earnestly for purposes of teaching and example only and, therefore, should not be construed in any way to limit the broad teachings of the present disclosure.

Mobile access such as a 3G/4G/LTE link can be used as a backup access link at a customer premises, such as a branch, when a primary customer edge-provider edge (CE-PE) fixed access link using T1/T3 is down. Using 4G/LTE as a branch backup solution may avoid the wide area network (WAN) failure scenario where an event that disables the primary line also disables the backup connection. Current branch backup uses a T1/T3 MPLS circuit. However, 4G/LTE provides more bandwidth at a lower cost. Present implementations of Mobile IP consider that all the available link and path selection is under the control of Mobile IP system. There is no assumption regarding the mobile network route reachability over an alternative path.

In current implementations, when the primary interface is up and learning the default route from the MPLS core as a default border gateway protocol (BGP) route and the Always On backup interface is brought up, the default Mobile IP route received from the mobile packet core network is not installed into the routing information base (RIB). In this case, when the primary BGP default route is lost, for the backup Mobile IP default route to be installed in the RIB one of the following condition have to be met:
1. Mobile IP registration Lifetime is expired and a re-registration is initiated. In this condition, convergence is based on the registration lifetime.
2. Force Mobile IP re-registration using "clear ip mobile router registration". In this case an embedded event manager (EEM) applet or manual intervention is needed to clear the Mobile IP registration.

Various embodiments described herein are directed to activating the mobile backup service based on the CE-PE link status on a mobile router (such as CE routing device 104) when the mobile service is used as a backup service and the primary MPLS virtual private network (VPN) link is down. In accordance with various embodiments, the mobile IP route is able to co-exist in the Routing Information Base (RIB) with the classic routing entries. Providing this capability significantly enhances the capability of the mobile router as the mobile router can have near 100% network uptime by providing fast convergence. In accordance with various embodiments, the mobile backup route can be used for redundancy and load sharing with the primary MPLS VPN route.

Mobile IP Route Activation when the Primary MPLS VPN Link is Down Using Bidirectional Forwarding Detection (BFD) Protocol In one embodiment, Bidirectional Forwarding Detection (BFD) protocol is used to detect when the primary MPLS link is down in order to active the backup mobile IP route. BFD is a detection protocol that is designed to provide fast forwarding path failure detection times for all media types, encapsulations, topologies, and routing protocols. BFD provides a consistent failure detection method for network administrators, in addition to fast forwarding path failure detection. Because the network administrator can use BFD to detect forwarding path failures at a uniform rate, rather than the variable rates for different routing protocol hello mechanisms, network profiling and planning is easier, and re-convergence time is consistent and predictable. In operation, BFD establishes a session between two network devices to detect failures on bidirectional forwarding paths between the devices and provides services for upper-level layer protocols. After BFD session establishment, both network devices start to transmit BFD control packets at a negotiated predetermined interval. Each time a BFD control packet is received, a detection timer is reset so that the BFD session remains up. If no BFD control packet is received within the predetermined interval, the BFD session state transmits to down and BFD notifies the failure to the upper-layer application it services. Accordingly, in accordance with various embodiments, CE routing device 104 is configured to monitor the status of the primary access link using BFD to determine whether the primary access link has failed.

In such embodiments, when the primary access link is down and the failure is detected using BFD, the Mobile IP link is brought up and the Mobile IP route is installed in the RIB so that the recovery of the WAN link failure is fast. This eliminates the requirement for the Mobile IP to re-register for the Mobile IP route to be active and recovers data plane disruption. In a particular embodiment, the service provider provides end-to-end BFD monitoring such that if BFD is enabled in enterprise CE aggregation routing device 108 and along the path in the service provider MPLS could, any failure information will be passed along to CE routing device 104 as a primary link failure event. The primary link failure event can be used by CE routing device 104 to trigger the activation of the mobile IP wireless link, In particular embodiments, CE routing device 104 receives the BFD update about the failure from the next hop PE router of first service provider MPLS core network 106.

Mobile IP Route as an Active Alternative Path with Other Routing Protocols: Multiprotocol Load Balancing In another embodiment, the Mobile IP route is used as an active alternative path with other routing protocols to provide for multiprotocol load balancing. A mobile router can have more than one routing protocol active on different WAN links on the same router. Currently multipath is possible only within the same routing protocol such as BGP or Mobile IP multipath. Based on this requirement there is a need for another protocol for load balancing among different IP routes across multiple routing protocols.

Current implementations allow only the best path with the lowest administrative distance to be installed in the Routing Information Base which is used for forwarding traffic. With multi-protocol load balancing as provided by one or more embodiments, a routing information base is configured within CE routing device 104 in which some or all of the possible routes to a destination are populated. Each of the participating routing protocols can have different weights as a share weight for load balancing. It is able to run independently to the participating routing protocols. Based on the weights for each link the data traffic is sent across in a round robin fashion.

Mobile IP Link as an Always on Active Link

In another embodiment, the Mobile IP link is used as an always on active link. In such an embodiment, a mobile router (such as CE routing device 104) is configured with a MPLS primary access link and a Mobile IP backup access link for situations in which the router WAN link capabilities are underutilized if the Mobile IP link is only used as a backup. Each 3G/4G connection plan has a minimal amount of bandwidth which is allocated to it with a purchased data plan from the Service Provider. If this is not utilized effectively, it does not offer a good business case. This allocated data plan can be used for periodic management traffic such as for system logs, Simple Network Management Protocol (SNMP), or the occasional bulk file.

With the branch access option of having T1/T3 as the primary access and the mobile 3G/4G link as the backup access, the Mobile IP system can be enhanced such that the default Mobile IP route co-exists with the traditional T1/T3 route with a different routing metric. This will provide a faster convergence of the branch office in a case of a primary access link failure.

Having both the primary default route learned from MPLS core and the backup route learned from Mobile Packet Core opens up the opportunity to use the 4G link in one or more of the following ways:
 1. As an always on backup with fast convergence as the alternate Mobile IP route is already installed in the RIB.
 2. As a secondary link for WAN link load balancing using PBR
 3. For occasional transfer (SCP/TFTP) of large files without impacting the critical traffic on the primary fixed access link.

In an example mechanism of operation according to one embodiment, CE routing device 104 is configured such that the Mobile IP link is operating as an always on backup access link and the primary fixed access link is a T1 link. Initially, the primary access link between CE routing device 104 and enterprise customer edge aggregation routing device 108 is established via a MPLS T1/T3 link. Layer 3 of the cellular interface of the backup mobile IP link between CE routing device 104 and enterprise customer edge aggregation routing device 108 is established (i.e., brought up) and has an associated IP address. The Layer 3 cellular interface remains up after the initial establishment. In particular embodiments, Mobile IP is used as the routing protocol between UE 102 and a home agent within the service provider network and is UP and in a Registered State. In particular embodiments, the backup mobile IP link is established using a network mobility (NEMO) protocol tunnel such as described in IETF RFC 5177. BGP is the primary access link protocol over the primary fixed access MPLS T1/T3 link and the default route out of the T1 interface is installed within the routing information base (RIB) of CE routing device 104. Mobile IP, though registered, cannot install the default route into the routing information base (RIB) as the default route is owned by BGP.

If the primary fixed access link fails (e.g. goes down), the routing agent of the CE routing device 104 detects by a suitable mechanism (e.g., BGP TCP session failure, BFD) that the primary fixed access link connection is out or has failed. If failure of the primary fixed access link is detected, the routing agent installs the Mobile IP route to the routing information base (RIB) of CE routing device 104 and uses the already established network mobility (NEMO) protocol tunnel to forward communications between UE 102 and enterprise customer edge aggregation routing device 108.

In an example mechanism of operation according to another embodiment, CE routing device 104 is configured such that the Mobile IP link is operating as an on demand backup access link and the primary fixed access link is a T1 link. In this particular embodiment, the cellular interface of the backup mobile IP link between CE routing device 104 and enterprise customer edge aggregation routing device 108 is initially down and has no assigned IP address. CE routing device 104 includes a dialer watch function configured to monitor the primary fixed access link for failure and the loss of the primary BGP route. When the primary BGP route is lost, the dialer watch function is triggered and the initiates the dialer to establish the connection for the cellular interface. CE routing device 104 then obtains an IP address and enables Mobile IP over a NEMO tunnel to advertise the enterprise routing. When the primary fixed access link is up, the cellular interface is reset after a dialer idle-timeout.

Accordingly, in one or more embodiments in which customer premise equipment (CPE) includes CE routing device 104 in which a fixed access link, such as an MPLS link, is used as a primary access link and a wireless mobile service link, such as a cellular 3G/4G link, is used as a backup access link, the mobile service link is activated/deactivated based on the state of the primary access link connectivity. In particular, the mobile backup service is activated or deactivated based upon weather path failure of the CE-PE link status is detected by CE routing device 104.

Various embodiments may provide one or more of the following advantages: fast convergence of the backup mobile link when the primary interface is down as the alternate Mobile IP route is installed in the RIB based on the state of the primary access link; Mobile IP backup connection availability on demand; can be used for as a secondary link for WAN link load balancing using policy-based routing (PBR); and can be used for occasional transfer (SCP/TFTP) of large files without impacting the critical traffic on the primary access link.

Figure 2:
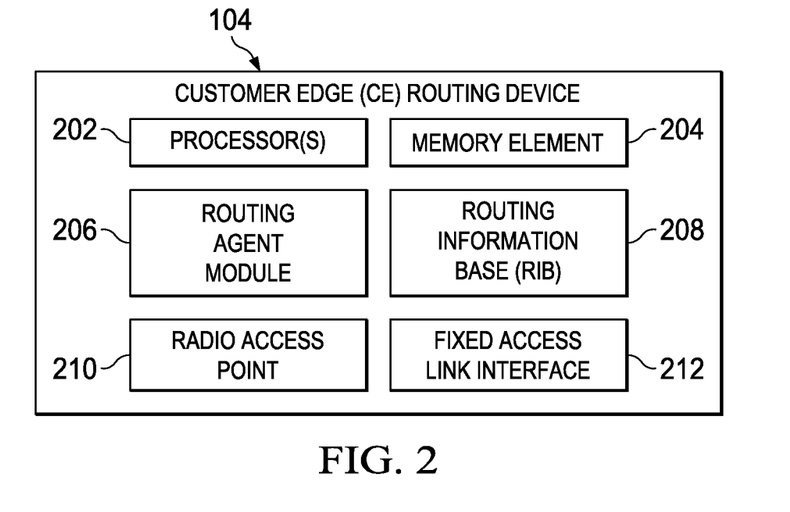
FIG. 2 is a simplified block diagram of a customer edge (CE) routing device in accordance with one embodiment.

Referring now to FIG. 2, FIG. 2 is a simplified block diagram of customer edge (CE) routing device 104 in accordance with one embodiment. CE routing device 104 includes one or more processors 202, a memory element 204, a routing agent module 206, a routing information base (RIB) 208, a radio access point 210, and a fixed access link interface 212. Processor(s) 202 is configured to execute various tasks of CE routing device 104 as described herein and memory element 204 is configured to store data associated with CE routing device 104. Routing agent module 206 is configured to perform the various routing agent functions of CE routing device 104 as described herein. RIB 208 is configured to store a routing table storing routing information associated with routes to particular network destinations from CE routing device 104. As described herein, in one or more embodiments, RIB 208 stores routing information associated with the primary fixed access link when the primary fixed access link is up, and stores routing information associated with the backup mobile IP (wireless) route when routing agent module 206 determines that the primary fixed access link has failed. Radio access point 210 is configured to communicate using a wireless radio connection, such as a 3G or 4G connection, over the backup access link to provide connectivity between CE routing device 104 and enterprise customer edge aggregation routing device 108 when the backup access link is active. Fixed access link interface 212 is configured to provide connectivity between CE routing device 104 and enterprise customer edge aggregation routing device 108 using the primary fixed access link when the primary fixed access link is active thru the MPLS cloud.

Figure 3:
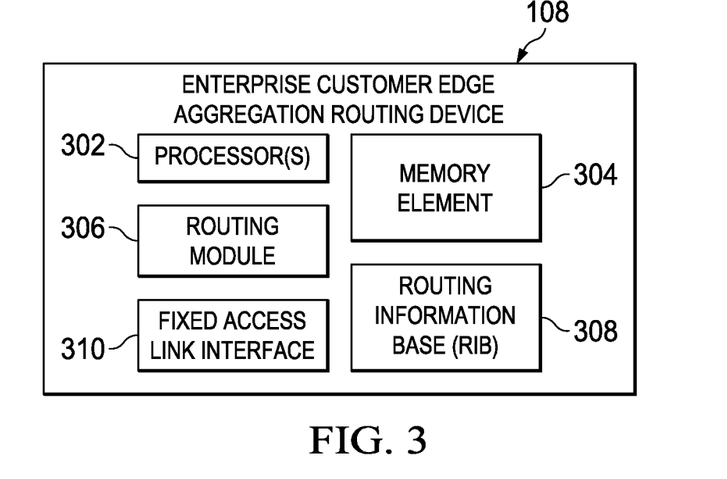
FIG. 3 is a simplified block diagram of an enterprise customer edge aggregation routing device in accordance with one embodiment.

Referring now to FIG. 3, FIG. 3 is a simplified block diagram of enterprise customer edge aggregation routing device 108 in accordance with one embodiment. Enterprise customer edge aggregation routing device 108 includes one or more processors 302, a memory element 304, a routing module 306, a routing information base (RIB) 308, and a fixed access link interface 310. Processor(s) 302 is configured to execute various tasks of Enterprise customer edge aggregation routing device 108 as described herein and memory element 304 is configured to store data associated with enterprise customer edge aggregation routing device 108. Routing module 306 is configured to perform the various routing functions of enterprise customer edge aggregation routing device 108 as described herein such as routing information between packet data network 120 to first service provider MPLS core network 106 and second service provider MPLS core network 116. RIB 308 is configured to store a routing table storing routing information associated with routes to particular network destinations from enterprise customer edge aggregation routing device 108. Fixed access link interface 310 is configured to provide connectivity between enterprise customer edge aggregation routing device 108 and one or more of first service provider MPLS core network 106, second service provider MPLS core network 116, and packet data network 120.

In one example implementation, CE routing device 104 and the PE routing device on the MPLS cloud are network elements that facilitate or otherwise help coordinate activities relating to activating a mobile backup access link based on a customer edge-provider edge (CE-PE) link status (e.g., for networks such as those illustrated in FIG. 1). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, CE routing device 104 and the PE routing device include software to achieve the operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Figure 4:
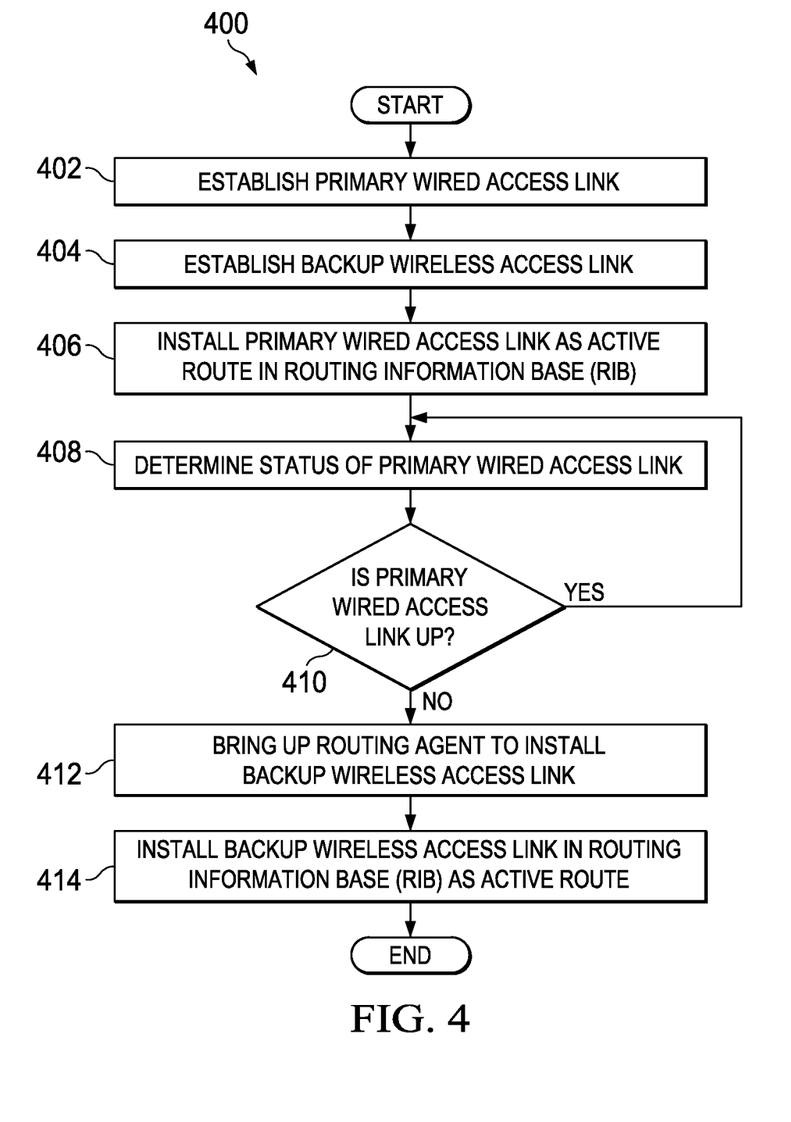
FIG. 4 is a simplified flowchart that illustrates example operations associated with activating mobile backup link based on customer edge-provider edge (CE-PE) link status by the CE routing device.

Referring now to FIG. 4, FIG. 4 is a simplified flowchart that illustrates example operations 400 associated with activating mobile backup access link based on customer edge-provider edge (CE-PE) link status by CE routing device 104. In 402, CE routing device 104 establishes a primary wired access link between CE routing device 104 and enterprise customer edge aggregation routing device 108. In particular embodiments, the primary wired access link is a T1/T3 MPLS link. In particular embodiments, CE routing device 104 utilizes a border gateway protocol (BGP) over the primary wired access link. In 404, CE routing device 104 establishes a backup wireless access link between CE routing device 104 and enterprise customer edge aggregation routing device 108. In particular embodiments, the backup wireless access link is one or more of a 3G, 4G, or LTE mobile link. In particular embodiments, CE routing device 104 utilizes a Mobile IP protocol over the backup wireless access link. In particular embodiments, the backup wireless access link is established using a tunneling protocol such as a network mobility (NEMO) protocol tunnel as described in IETF RFC 5177.

In 406, CE routing device 104 installs the primary wired access link as the active route in the Routing Information Base (RIB) of CE routing device 104. After installation of the primary wired access link as the active route in the RIB, CE routing device 104 will utilize the primary wired access link to allow communication of data traffic associated with UE 102 to and/or from enterprise customer edge aggregation routing device 108 to provide access of packet data network 120 to UE 102. In 408, CE routing device 104 determines a status of the primary wired access link indicative of whether the primary wired access link between the CE routing device 102 and enterprise customer edge aggregation routing device 108 has failed. In particular embodiments, CE routing device 102 uses a Bidirectional Forwarding Detection (BFD) protocol to determine whether the primary wired access link has failed. In a particular implementation of the BFD protocol, CE routing device 104 and PE routing device on the provider MPLS cloud periodically exchange Hello packets to each other. If a number of the Hello packets are not received by CE routing device 104 within a predetermined time period, CE routing device 104 determines that the status of the primary wired access link is indicative of that the primary wired access link has failed. In other particular embodiments, CE routing device 102 may use any suitable mechanism to determine the status of the primary wired access link such as BGP TCP session failure.

In 410, CE routing device 104 determines whether the primary wired access link is up passed upon the determined status of the primary wired access link. If the determined status is indicative of the primary wired access link being up, the operations return to 408 and CE routing device continues to monitor the primary wired access link for failure. If the determined status is indicative of the primary wired access link being failed, the operations continue to 412. In 412, CE routing device 104 brings up the routing agent of CE routing device 104 to install the backup wireless access link as the active route in the RIB. In 414, the routing agent of CE routing device 104 activates the backup wireless access link between CE routing device 104 and enterprise customer edge aggregation routing device 108 by installing the backup wireless access link in the RIB of CE routing device 104 as the active route. Upon installation of the backup wireless access link as the active route in the RIB of CE routing device 104, CE routing device 104 will no longer use the primary wired access link and will instead use the backup wireless access link to allow communication of data traffic associated with UE 102 to and/or from enterprise customer edge aggregation routing device 108 to provide access of packet data network 120 to UE 102. In some embodiments, CE routing device 104 may be configured to re-install the primary wired access link in the RIB when it is determined that the primary wired access link is no longer in a failed state.

In regards to the internal structure associated with communication system 100, each of CE routing device 104 and/or PE routing device 108 can include memory elements for storing information to be used in achieving the operations, as outlined herein. Additionally, each of these devices may include a processor that can execute software or an algorithm to perform the activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to CE routing device 104 and/or PE routing device could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIGS. 2 and 3] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIGS. 2 and 3] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 100 may be applicable to other exchanges, routing protocols, or routed protocols. Moreover, although communication system 100 has been illustrated with reference to particular elements and operations that facilitate the communication process, these elements and operations may be replaced by any suitable architecture or process that achieves the intended functionality of communication system 100.

In a separate endeavor, communication system 100 may generally be configured or arranged to represent a 3G, 4G, or LTE architecture applicable to UMTS environments in accordance with a particular embodiment. However, the 3G, 4G, and LTE architectures are offered for purposes of example only and may alternatively be substituted with any suitable networking system or arrangement that provides a communicative platform for communication system 100. Moreover, the present disclosure is equally applicable to other cellular and/or wireless technology including CDMA, Wi-Fi, WiMAX, etc. Further, although several embodiments have been illustrating using T1/T3 architectures for fixed and/or wired access links, it should be understood that the T1/T3 access links may be substituted with any suitable fixed and/or wired access links.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    establishing a primary wired access link between a first routing device and a second routing device, wherein the first routing device is a customer edge mobile routing device in communication with a wired core network and a mobile core network and wherein the primary wired access link uses a first routing protocol;
    establishing a backup wireless access link between the first routing device and the second routing device, wherein the backup wireless access link uses a second routing protocol, wherein the second routing protocol is different from the first routing protocol, and wherein the primary wired access link using the first routing protocol and the backup wireless access link using the second routing protocol co-exist within a routing information base of the first routing device, each of the primary wired access link and the backup wireless access link being installable as an active route within the routing information base;
    installing the primary wired access link in the routing information base of the first routing device as the active route;
    determining, by a routing agent of the first routing device, a status of the primary wired access link indicative of whether the primary wired access link between the first routing device and the second routing device has failed; and
    activating, by the first routing device, the backup wireless access link between the first routing device and the second routing device when it is determined that the status of the primary wired access link is indicative that the primary wired access link has failed, wherein activating the backup wireless access link between the first routing device and the second routing device includes the routing agent of the first routing device installing the backup wireless access link in the routing information base as the active route responsive to determining that the status of the primary wired access link is indicative that the primary wired access link has failed, wherein installing the backup wireless access link in the routing information base comprises switching from use of the first routing protocol to use of the second routing protocol.

2. The method of claim 1, wherein determining the status of the primary wired access link includes determining whether the primary wired access link has failed using a Bidirectional Forwarding Detection (BFD) protocol.

3. The method of claim 1, wherein the primary wired access link is a Multiprotocol Label Switching (MPLS) link.

4. The method of claim 1, wherein the primary wired access link is one or more of a TI link or a T3 link.

5. The method of claim 1, wherein the primary wired access link utilizes a border gateway protocol (BGP).

6. The method of claim 1, wherein the backup wireless access link utilizes a mobile IP protocol.

7. The method of claim 1, wherein the backup wireless access link is one or more of a 3G link, a 4G link, or an LTE link.

8. The method of claim 1, wherein the second routing device is a provider edge routing device.

9. Logic encoded in one or more non-transitory media that includes code for execution and when executed by a processor is operable to perform operations comprising:
    establishing a primary wired access link between a first routing device and a second routing device, wherein the first routing device is a customer edge mobile routing device in communication with a wired core network and a mobile core network and wherein the primary wired access link uses a first routing protocol;
    establishing a backup wireless access link between the first routing device and the second routing device, wherein the backup wireless access link uses a second routing protocol, wherein the second routing protocol is different from the first routing protocol, and wherein the primary wired access link using the first routing protocol and the backup wireless access link using the second routing protocol co-exist within a routing information base of the first routing device, each of the primary wired access link and the backup wireless access link being installable as an active route within the routing information base;
    installing the primary wired access link in the routing information base of the first routing device as the active route;
    determining, by a routing agent of the first routing device, a status of the primary wired access link indicative of whether the primary wired access link between the first routing device and the second routing device has failed; and
    activating, by the first routing device, the backup wireless access link between the first routing device and the second routing device when it is determined that the status of the primary wired access link is indicative that the primary wired access link has failed, wherein activating the backup wireless access link between the first routing device and the second routing device includes the routing agent of the first routing device installing the backup wireless access link in the routing information base as the active route responsive to determining that the status of the primary wired access link is indicative that the primary wired access link has failed, wherein installing the backup wireless access link in the routing information base comprises switching from use of the first routing protocol to use of the second routing protocol.

10. The logic of claim 9, wherein determining the status of the primary wired access link includes determining whether the primary wired access link has failed using a Bidirectional Forwarding Detection (BFD) protocol.

11. The logic of claim 9, wherein the second routing device is a provider edge routing device.

12. A first routing device, comprising:
a memory element configured to store electronic code;
a processor operable to execute instructions associated with the electronic code; and
a module coupled to the memory element and the processor, wherein the first routing device is configured for:
    establishing a primary wired access link between the first routing device and a second routing device, wherein the first routing device is a customer edge mobile routing device in communication with a wired core network and a mobile core network and wherein the primary wired access link uses a first routing protocol;
    establishing a backup wireless access link between the first routing device and the second routing device, wherein the backup wireless access link uses a second routing protocol, wherein the second routing protocol is different from the first routing protocol, and wherein the primary wired access link using the first routing protocol and the backup wireless access link using the second routing protocol co-exist within a routing information base of the first routing device, each of the primary wired access link and the backup wireless access link being installable as an active route within the routing information base;
    installing the primary wired access link in the routing information base of the first routing device as the active route;
    determining, by a routing agent of the first routing device, a status of the primary wired access link indicative of whether the primary wired access link between the first routing device and the second routing device has failed; and
    activating, by the first routing device, the backup wireless access link between the first routing device and the second routing device when it is determined that the status of the primary wired access link is indicative that the primary wired access link has failed, wherein activating the backup wireless access link between the first routing device and the second routing device includes the routing agent of the first routing device installing the backup wireless access link in the routing information base as the active route responsive to determining that the status of the primary wired access link is indicative that the primary wired access link has failed, wherein installing the backup wireless access link in the routing information base comprises switching from use of the first routing protocol to use of the second routing protocol.

13. The first routing device of claim 12, wherein determining the status of the primary wired access link includes determining whether the primary wired access link has failed using a Bidirectional Forwarding Detection (BFD) protocol.

14. The first routing device of claim 12, wherein the second routing device is a provider edge routing device.

* * * * *